(12) United States Patent
Bell (10) Patent No.: US 9,702,730 B2
(45) Date of Patent: Jul. 11, 2017

(54) SYSTEMS AND METHODS FOR ESTIMATING CONSERVATION ALLOCATION WITH PARTIAL AMI

(71) Applicant: Utilidata, Inc., Providence, RI (US)

(72) Inventor: David Gordon Bell, Spokane, WA (US)

(73) Assignee: UTILIDATA, INC., Providence, RI (US)

(*) Notice: Subject to any disclaimer, the term of this patent is extended or adjusted under 35 U.S.C. 154(b) by 203 days.

(21) Appl. No.: 14/454,561

(22) Filed: Aug. 7, 2014

(65) Prior Publication Data

US 2015/0042488 A1    Feb. 12, 2015

Related U.S. Application Data

(60) Provisional application No. 61/864,415, filed on Aug. 9, 2013.

(51) Int. Cl.
*G01D 4/00* (2006.01)
*G08C 19/02* (2006.01)
*H02J 13/00* (2006.01)

(52) U.S. Cl.
CPC .............. *G01D 4/002* (2013.01); *G08C 19/02* (2013.01); *H02J 13/00* (2013.01); *Y02B 90/241* (2013.01); *Y04S 20/32* (2013.01)

(58) Field of Classification Search
CPC ................................ G08C 19/02; G08C 17/02
See application file for complete search history.

(56) References Cited

U.S. PATENT DOCUMENTS

| | | | | |
|---|---|---|---|---|
| 2010/0088153 A1* | 4/2010 | Faure | ................ | G06Q 30/0202 705/7.31 |
| 2010/0217549 A1* | 8/2010 | Galvin | ..................... | H04B 3/54 702/62 |
| 2012/0123995 A1* | 5/2012 | Boot | ................... | G01R 21/1333 706/54 |
| 2013/0262197 A1* | 10/2013 | Kaulgud | ............... | G05B 13/02 705/14.1 |

(Continued)

OTHER PUBLICATIONS

Kimothi, Shri Krishna. (2002). Uncertainty of Measurements—Physical and Chemical Metrology—Impact and Analysis. American Society for Quality (ASQ).*

*Primary Examiner* — Laura Nguyen
(74) *Attorney, Agent, or Firm* — Foley & Lardner LLP; Christopher J. McKenna (57) ABSTRACT

This disclosure is directed to a system and method of allocating energy provided by a power source. The system includes a computing device that receives, from meters, observations of energy delivered by the power source to sites. The device classifies the sites into consumption classes, where a first consumption class has complete coverage and a second consumption class has incomplete coverage. The device determines a metric for a characteristic of energy for the first class. The device determines a first demand for the first class based on the metric for the characteristic of energy for the first class. The device generates a sampling distribution of the metric for the characteristic for the second class and determines a second demand for the second class based on the sampling distribution. The device determines a dissipation metric based on the first and second demands.

20 Claims, 3 Drawing Sheets

(56) References Cited

U.S. PATENT DOCUMENTS

| | | | |
|---|---|---|---|
| 2013/0321040 A1* | 12/2013 | Johal | H02J 3/14 327/113 |
| 2013/0335062 A1* | 12/2013 | de Buda | G01R 21/00 324/142 |
| 2013/0342359 A1* | 12/2013 | Miyaji | G08C 17/02 340/870.03 |
| 2014/0330536 A1* | 11/2014 | Chen | G06F 17/18 702/181 |
| 2014/0359186 A1* | 12/2014 | Helmschmidt | H04L 9/3247 710/264 |

* cited by examiner

SYSTEMS AND METHODS FOR ESTIMATING CONSERVATION ALLOCATION WITH PARTIAL AMI

CROSS-REFERENCE TO RELATED APPLICATIONS

This application claims the benefit of priority under 35 U.S.C. §119 of U.S. Provisional Patent Application No. 61/864,415 filed Aug. 9, 2013, which is incorporated by reference herein in its entirety for all purposes.

FIELD OF THE DISCLOSURE

This disclosure generally relates to systems and methods for estimating conversation allocation with partial advanced metering infrastructure ("AMI"). More specifically, the present disclosure relates to estimating the allocation of energy delivered at a distribution metering point with respect to the contributions due to consumers as observed at the consumer delivery points (site meters or AMI nodes) and the contribution of the sum of all dissipation in the distribution infrastructure applicable to the consumers, when there is incomplete consumer metering information.

BACKGROUND

Utility providers or other entities, such as providers of electrical energy, may monitor various parameters associated with the electrical energy they provide to consumers to facilitate efficiently delivering energy to an end user or consumer. Utility providers may use advanced metering infrastructure to measure, collect and analyze energy usage, and communicate with metering devices such as electricity meters, either on request or on a schedule. Advanced metering infrastructure can include devices such as smart meters that record information about the consumption of electrical energy and communicate that information back to a utility or other entity. While utility providers may be able to identify energy usage for a consumer associated with an electricity meter, it can be challenging to estimate the allocation of energy delivered due to contributions of consumers and dissipation in the distribution infrastructure when there is incomplete consumer metering information.

BRIEF SUMMARY OF THE DISCLOSURE

Systems and methods of the present disclosure facilitate estimating the allocation of energy delivered at a distribution metering point when there is incomplete consumer metering information, such as when metering information is not available for every consumer. In various embodiments, the present disclosure can estimate the contributions due to consumers as observed at the consumer deliver points, such as site meters (e.g., via a smart meter associated with advanced metering infrastructure), and the contribution of the sum of all dissipation in the distribution infrastructure applicable to the consumers. Based on these contributions, an estimate can be carried out in an operating voltage regime for the distribution circuit(s) originating at the distribution metering point.

In some embodiments, the systems and methods of the present disclosure can formulate, identify, or determine estimates for the contributions due to consumers at the consumer delivery points and contributions due to dissipation in the distribution infrastructure by accounting for incomplete consumer metering information, including, e.g., situations in which metering information may not be available for every consumer. In some embodiments, a system for estimating the allocation of energy delivered at a distribution metering point can be configured to estimate the amount of unmetered consumption in one or more consumer or consumption classes using one or more estimators. The estimators can be based on the availability of population parameters derived from sample statistics based, at least in part, on metered consumption and other estimates or measurements such as a consumption power factor. For example, the population parameters can be based on classifying consumers by relevant demographic considerations and/or nominal connection capacity. The system can construct consumption class samples such that their respective population parameters can be estimated from the samples. In another example, the system can be configured to sample sub-populations of classified consumer site observations of electrical quantities such that the sampled subpopulations are associated with a substantially similar probability structure as their respective full populations.

Based on various estimators, parameters, and/or measurements, the system can estimate (e.g., based on a statistical analysis) a total demand for a consumption class based on a per unit basis. For example, the mean per unit demand of samples drawn from a given population may be used to infer the mean of that population. By repeated sampling, the system can estimate the sampling distributions of means (e.g., statistical locations of the sub-populations).

In various embodiments, systems and methods of the present disclosure can estimate the allocation of energy delivered via an energy distribution system with a partial advanced metering infrastructure by:

(s0) Establishing consumer classification criteria such as (i) 240V single phase, service up to 150 A (e.g., nominal connection capacity); (ii) residential 240V single phase, service at least 200 A; (iii) small commercial, unit capacity up to 100 kVA; (iv) commercial, 480V three phase, unit capacity up to 500 kVA; (v) commercial/industrial, unit capacity at least 500 kVA.

(s1) Sorting the available metering observations such that each observation is allocated to exactly one of the consumption classes established in Step (s0), where large consumers are may be metered, so that their metering observations may be used in accumulating total consumption; estimates derived from consumption class statistics may not apply to these consumers.

(s2) Determining a demand interval for the application of estimates.

(s3) Computing and/or recording the interval per-unit apparent power for one or more metered sites using, e.g., the metered apparent demand (VA) and the base capacity of the site connection. Record the power factor associated with this observation.

(s4) Computing and/or recording the sample statistics of the per-unit apparent power and the associated power factors from (s3) on the consumption class basis; sample mean and variance are required.

(s5) Determining, for one or more consumption class, if the site metering coverage is complete.

(s5a) Segregating, if coverage is complete, the sample statistics computed in (s3) by consumption class in (s1) can be assumed to be unbiased estimates of the corresponding sub-population parameters for the associated consumption class.

(s5b) Constructing, if coverage is incomplete, the sampling distribution of means for one or more affected consumption class; the choice of sample size and estimated number of samples may be later determined.

(6) Estimating the total apparent demand for each consumption class using the mean per-unit estimates and the total connected capacities derived from utility records. Applying the estimated mean power factor for each consumption class to estimate the total real demand.

(s7) Summing the estimated consumption class demands to obtain the estimated total consumer demand. In one embodiment, the method can include calculating confidence based variance estimates.

(s8) Comparing the results in (s7) against the circuit quantities metered at the origin (substation) to obtain one or more dissipation metrics.

In some embodiments, (s3) through (s6) can be repeated one or more times for one or more applicable demand interval, and may be repeated for one or more demand cycle records to develop seasonal or other forecasting estimators.

The systems and methods of the present disclosure can be applied in one or more circuit operational regimes in order to obtain comparative results. For example, a circuit may be operated in the 'automated VVO' and 'non-VVO' regimes, permitting comparison of the effects on both consumer demand (in the prescribed classes) and on infrastructure dissipation.

At least one aspect is directed to a method of allocating energy provided by a power source. In one embodiment, the method includes a computing device receiving, from one or more metering devices, meter observations of a characteristic of electricity supplied to a plurality of consumer sites via a power source. A first consumer site of the plurality consumer sites is coupled to a first metering device of the one or more meter devices, and the one or more metering devices is absent from a second consumer site of the plurality of consumer sites. The method includes the computing device classifying the plurality of consumer sites into a plurality of consumption classes. A first consumption class of the plurality of consumption classes can have complete coverage (e.g., each consumer sites may be coupled to a metering device). A second consumption class of the plurality of consumption classes has incomplete coverage (e.g., a consumer site that is not coupled to a metering device). The second consumption class includes the second consumer. The method can include the computing device determining a metric for a per-unit characteristic of electricity for the first consumption class having complete coverage. The method can include the computing device generating a sampling distribution of the metric for the per-unit characteristic for the second consumption class having incomplete coverage. The method can include the computing device determining a first demand for the first consumption class based on the metric for the per-unit characteristic of electricity for the first consumption class. The method can include the computing device determining a second demand for the second consumption class based on the sampling distribution of the metric for the per-unit characteristic for the second consumption class. The method can include the computing device comparing a summation of the first demand and the second demand with a characteristic of energy observed at a substation to determine a dissipation metric, the substation conveying energy from the power source to the distribution point.

In some embodiments, the method includes the computing device classifying the consumer sites into the plurality of consumption classes based on at least one of a demographic consideration, a nominal connection capacity, and a probability structure.

In some embodiments, the method includes the computing device associating each of the meter observations with a corresponding consumption class of the plurality of consumption classes. In some embodiments, the metric comprises a statistical metric including at least one of a mean, a standard deviation, and a variance.

In some embodiments, the method includes the computing device identifying, for each of the plurality of consumption classes, the per-unit characteristic of electricity based on the meter observations from the one or more metering devices.

In some embodiments, the method includes the computing device determining, by the computing device, the first demand based on a mean per-unit characteristic for the first consumption class. The method can include the computing device determining the second demand based on a mean of a means sampling distribution of the per-unit characteristic for the second consumption class.

In some embodiments, the method includes the computing device determining the sampling distribution of the metric for the per-unit characteristic for the second consumption class based on a predetermined sample size. In some embodiments, the method includes the computing device determining the per-unit characteristic based on a per-unit apparent power for the one or more metering devices. In some embodiments, the method includes the computing device determining, by the computing device, the first demand based on a first power factor for the first consumption class. The method can include the computing device determining the second demand based on a second power factor for the second consumption class.

In some embodiments, the method includes the computing device identifying a demand interval for determining the first demand and the second demand. The method includes the computing device repeating the determining of the first demand and the second demand based on the demand interval. In some embodiments, the method includes the computing device determining the second demand based on a confidence threshold. In some embodiments, the method includes the computing device receiving the characteristic of electricity observed at the substation via a metering device at the substation.

Another aspect of the present disclosure is directed to a system for allocation of energy provided by a power source. In some embodiments, the system can include one or more metering devices coupled to one or more consumer sites of a plurality of consumer sites. A first consumer site of the plurality consumer sites is coupled to a first metering device of the one or more meter devices. The one or more metering devices are absent from a second consumer site of the plurality of consumer sites. The system can include a computing device having one or more processors. The one or more processors can execute an interface, a classifier, and an estimator of the computing device. The computing device can be configured to receive, from the one or more metering devices, meter observations indicative of a characteristic of electricity delivered by a power source to the plurality of consumer sites. The computing device can be configured to classify the plurality of consumer sites into a plurality of consumption classes. A first consumption class of the plurality of consumption classes has complete coverage and a second consumption class of the plurality of consumption classes has incomplete coverage. The second consumption class includes the second consumer site. The computing device can be configured to determine a metric for a per-unit characteristic of electricity for the first consumption class having complete coverage. The computing device can be configured to generate a sampling distribution of the metric for the per-unit characteristic for the second consumption class having incomplete coverage. The computing device can be configured to determine a first demand for the first consumption class based on the metric for the per-unit characteristic of electricity for the first consumption class. The computing device can be configured to determine a second demand for the second consumption class based on the sampling distribution of the metric for the per-unit characteristic for the second consumption class. The computing device can be configured to compare a summation of the first demand and the second demand with a characteristic of electricity observed at a substation to determine a dissipation metric. The substation can convey electricity from the power source to the distribution point.

In some embodiments, the computing device is further configured to classify the consumers into the plurality of consumption classes based on at least one of a demographic consideration, a nominal connection capacity, and a probability structure. In some embodiments, the computing device is further configured to associate each of the meter observations with a corresponding consumption class of the plurality of consumption classes.

In some embodiments, the metric includes a statistical metric including at least one of a mean, a standard deviation, and a variance. In some embodiments, the computing device is further configured to identify for each of the plurality of consumption classes, the per-unit characteristic of energy based on the meter observations from the one or more metering devices.

In some embodiments, the computing device is further configured to determine the first demand based on a mean per-unit characteristic for the first consumption class. The computing device can be further configured to determine the second demand based on a mean of a means sampling distribution of the per-unit characteristic for the second consumption class.

In some embodiments, the computing device is further configured to determine the sampling distribution of the metric for the per-unit characteristic for the second consumption class based on a predetermined sample size. In some embodiments, the computing device is further configured to determine the per-unit characteristic based on a per-unit apparent power for the one or more metering devices.

In some embodiments, the computing device is further configured to determine the first demand based on a first power factor for the first consumption class. The computing device can be further configured to determine the second demand based on a second power factor for the second consumption class.

In some embodiments, the computing device is further configured to identify a demand interval for determining the first demand and the second demand. The computing device can repeatedly determine the first demand and the second demand based on the demand interval.

In some embodiments, the computing device is further configured to determine the second demand based on a confidence threshold. In some embodiments, the computing device can be further configured to receive the characteristic of energy observed at the substation via a metering device at the substation.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Systems and methods of the present disclosure facilitate estimating the allocation of energy delivered at a distribution metering point when there is incomplete consumer metering information. Incomplete consumer metering information may result from metering devices not being present or coupled to a consumer site, or when a metering device at a consumer site is not functioning properly. In various embodiments, the present disclosure can estimate the contributions due to consumers as observed at the consumer deliver points, such as site meters (e.g., via a smart meter associated with advanced metering infrastructure), and the contribution of the sum of all dissipation in the distribution infrastructure applicable to the consumers. Based on these contributions, an estimate can be carried out in an operating voltage regime for the distribution circuit(s) originating at the distribution metering point. In some embodiments, the systems and methods of the present disclosure can formulate, identify, or determine estimates for the contributions due to consumers at the consumer delivery points and contributions due to dissipation in the distribution infrastructure by accounting for incomplete consumer metering information, including, e.g., situations in which metering information may not be available for every consumer. However, the accuracy of the site meter may influence the accuracy of the estimation of the infrastructure dissipation.

In some embodiments, the system includes various components and circuits configured to measure, monitor, record, or obtain information associated with the consumption of electrical energy at a consumer location, and/or the dissipation of electrical energy in a distribution infrastructure. The system can include one or more processors, circuits, modules or interfaces configured to obtain and analyze this information. The information may be communicated via a wired or wireless data network such as Ethernet, universal serial bus (USB), PS/2 port, serial port, Fire Wire, Thunderbolt, WiFi, Bluetooth, GSM, cellular networks, WiMax, or any other data network or communication network. In some embodiments, the system can include, be configured to communicate with, or communicatively coupled to one or more components of an advanced metering infrastructure ("AMI"), including, e.g., smart meters, 2-way smart meters, or other type of electrical meter configured to obtain information about electrical energy. In order to estimate the allocation of energy delivered at a distribution metering point, the system can be configured to take into account one or more assumptions or prescriptions. In various embodiments, the system can:

(i) Classify consumers based on relevant demographic considerations and/or nominal connection capacity. Consumption classes so constructed may be sampled such that their respective population parameters may be estimated from samples.

(ii) Sampled sub-populations of classified consumer site observations of electrical quantities may include substantially similar probability structures as those of their respective full populations.

(iii) The statistical location (e.g., means) of the sub-populations in (ii) may be equal (or assumed to be substantially equal) to the locations of their full populations, and the variances in (ii) may be scaled according to the sub-population sample size.

(iv) The consumption class populations proposed in (i) can be substantially approximated by a Gaussian density. Accordingly, the relevant means can be considered to be unbiased and a consistent estimate of distribution locations. The system can apply standard scoring using the variances for estimation of confidence bounds.

(v) The estimates and/or measurements of consumption power factors may be available by demand class.

(vi) The real, reactive, and apparent power demands as observed, recorded, monitored or otherwise identified at the substation metering point can include time varying and/or a cyclical pattern and may further include a random component of unknown density.

In some embodiments, an estimate for the allocation of energy delivered at a distribution metering point (e.g., including the contributions due to consumers as observed at the consumer delivery points and the contribution of the sum of all dissipation in the distribution infrastructure applicable to the consumer) may be computed in distribution circuits for which the consumer demand is known (e.g., where the delivery sites are suitably metered). Furthermore this estimate can be computed if the operating voltage regimes are properly characterized.

To estimate the allocation of energy delivered in a specified operating voltage regime for the distribution circuit where there is incomplete consumer metering information (e.g., where information may not be available for every consumer), the system can determine one or more estimator based on sampled data in one or more consumer classes. The estimators formulated here can be based on population parameters derived from sample statistics, which can be in accordance with the consumer classifications in (i) and the sampled sub-populations in (ii). The system may then determine a total demand for a given consumption class based on a per unit basis. For example, the system may determine the total demand for a consumption class based on a mean per unit demand of samples drawn from a given population in order to identify the mean of that population.

The system may then repeatedly sample consumers in one or more classes to generate an estimate of a sampling distribution of means. Based on the statistical locations in (iii) and the approximations of the consumption class in (iv), the system can estimate the mean of each consumption class population as the mean of these means sampling distributions. They system may determine or otherwise identify that the respective means are identical, rather than assume that the means sampling distributions are the same as those of the corresponding populations.

Figure 1:
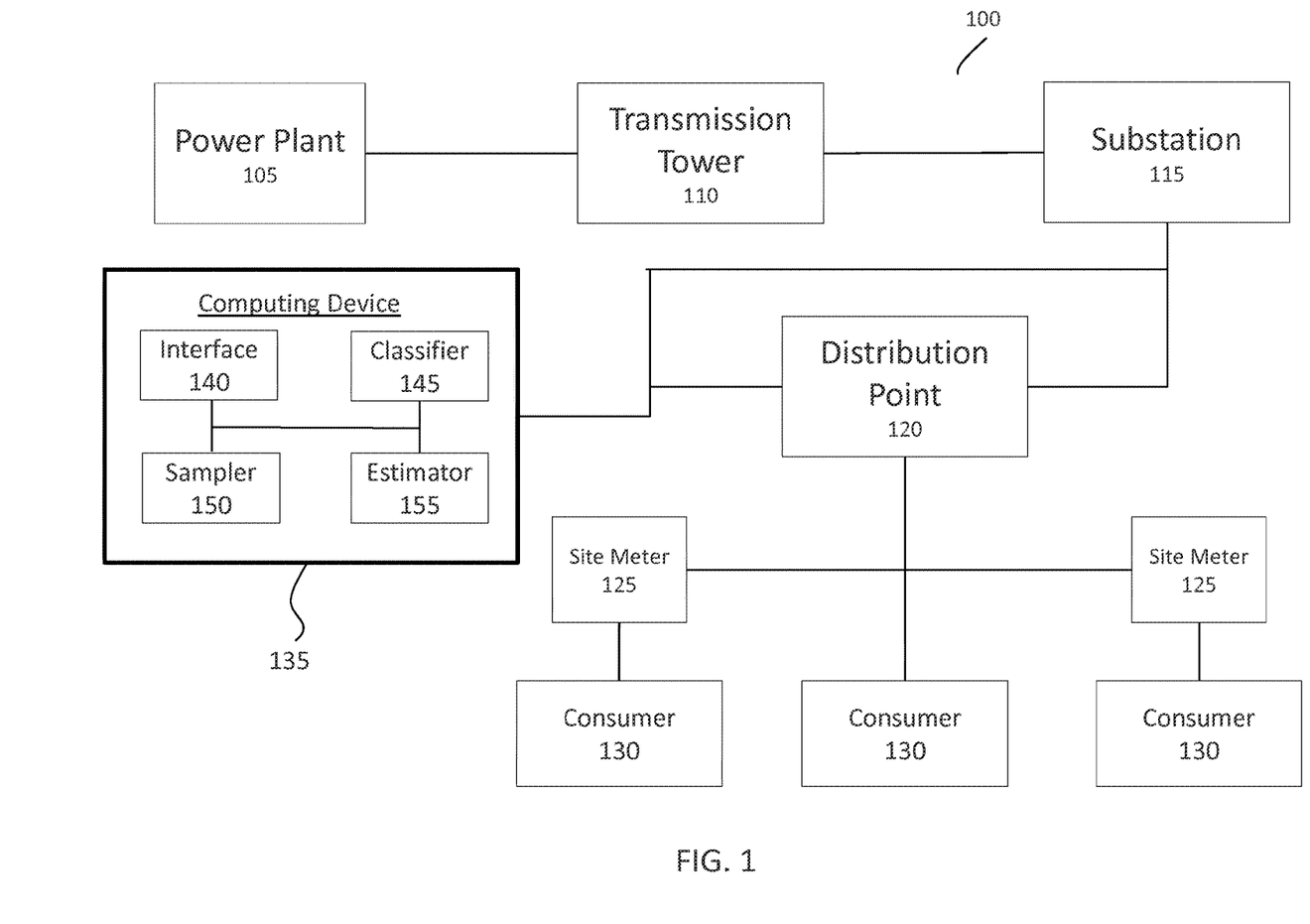
FIG. 1 is a block diagram depicting an embodiment of a system for estimating the allocation of energy delivered when there is incomplete metering information.

FIG. 1 is a block diagram depicting an embodiment of a system 100 for estimating the allocation of energy delivered when there is incomplete metering information. In brief overview, the system 100 can include one or more of a power plant or power source 105 for generating power (e.g., electrical energy), transmission tower 110 for conveying electricity, electrical substation 115 to transform voltage from high to low (or low to high) via one or more transformers or perform other functions that facilitate distributing electricity via the distribution infrastructure, and distribution point 120 for distributing power from the substation 115 to end consumers or consumer sites 130. The distribution point 120 can be electrically coupled to one or more consumers or consumer sites 130 via one or more site meters or AMI nodes 125. In some embodiments, one or more consumer sites 130 may not be coupled to a site meter 125. The system may include a computing device 135 that includes one or more processors, components, modules, logic arrays, etc. configured to perform one or more functions to facilitate estimating the allocation of delivered electrical energy. The computing device 135 may be communicatively, electrically or otherwise coupled with a distribution point 120, substation 115 or any other component of system 100. In some embodiments, computing device 135 may exist in a distribution substation 120 or substation 115, or power plant 105. In other embodiments, the computing device 135 may be remote to one or more component of the distribution system (e.g., 105, 110, 115, 120, 125, and 130). In some embodiments, the computing device 135 includes an interface to receive information from one or more component of system 100, a classifier 145 configured to classify consumers, a sampler 150 configured to obtain samples of energy consumption, and an estimator 155 to perform one or computations based on the obtained information.

In further detail, the power plant 105 may include an installation where electrical power is generated for distribution. The power plant 105 may include an engine or other apparatus that generates electrical power. The power plant 105 may create electrical power by converting power or energy from one state to another state. In some embodiments, the power plant 105 may be refer to or include a power source, power station, generating station, power plant, powerhouse or generating plant. In some embodiments, the power plant 105 may include a generator, such as a rotating machine that converts mechanical power into electrical power by creating relative motion between a magnetic field and a conductor. The power plant 105 can use one or more energy source to turn the generator including, e.g., fossil fuels such as coal, oil, and natural gas, nuclear power, or cleaner renewable sources such as solar, wind, wave and hydroelectric.

In some embodiments, the system 100 includes one or more transmission towers 110. A transmission tower 110 may include a structure (e.g., a steel lattice tower, concrete, wood, etc.), that supports an overhead power line used to distribute electricity from a power plant 105 to a substation 115 or distribution point 120. Transmission towers 110 can be used in high-voltage AC and DC systems, and come in a wide variety of shapes and sizes. In an illustrative example, a transmission tower can range in height from 15 to 55 meters or up to several hundred meters. Transmission towers 110 can be of various types including, e.g., suspension, terminal, tension, and transposition. In some embodiments, the system 100 may include underground power lines in addition to or instead of transmission towers 110.

In some embodiments, the system 100 includes a substation 115 or electrical substation 115. A substation may be part of an electrical generation, transmission, and distribution system. In some embodiments, the substation 115 transform voltage from high to low, or the reverse, or perform any of several other functions to facilitate the distribution of electricity. In some embodiments, the system 100 may include several substations 115 between the power plant 105 and the consumer 105 with electric power flowing through them at different voltage levels.

In some embodiments, the substations may be remotely operated, supervised and controlled (e.g., via a supervisory control and data acquisition system). A substation may include one or more transformers to change voltage levels between high transmission voltages and lower distribution voltages, or at the interconnection of two different transmission voltages.

In some embodiments, the system 100 includes a distribution point 120, which may refer to an electric power distribution system. In some embodiments, the distribution point 120 may be a final or near final stage in the delivery of electric power. For example, the distribution point 120 can carry electricity from the transmission system (which may include one or more transmission towers 110) to individual consumers 130. In some embodiments, the distribution system may include the substations 115 and connect to the transmission system to lower the transmission voltage to medium voltage ranging between 2 kV and 35 kV with the use of transformers, for example. Primary distribution lines carry this medium voltage power to distribution transformers located near the customer's premises 130. Distribution transformers may further lower the voltage to the utilization voltage of appliances and may feed several customers through secondary distribution lines at this voltage. Commercial and residential customers 130 may be connected to the secondary distribution lines through service drops. In some embodiments, customers demanding high load may be connected directly at the primary distribution level or the subtransmission level.

In some embodiments, the system 100 includes one or more consumer sites 130. Consumer sites 130 may include, for example, a building, house, shopping mall, factory, office building, residential building, commercial building, stadium, movie theater, etc. The consumer sites may be configured to receive electricity from the distribution point 120 via a power line (above ground or underground). In some embodiments, a consumer site 130 may be coupled to the distribution point 120 via a power line. In some embodiments, the consumer site 130 may be further coupled to a site meter or advanced metering infrastructure ("AMI").

In some embodiments, the system 100 includes site meters 125 or AMI. Site meters 125 can measure, collect, and analyze energy usage, and communicate with metering devices such as electricity meters, gas meters, heat meters, and water meters, either on request or on a schedule. Site meters 125 can include hardware, software, communications, consumer energy displays and controllers, customer associated systems, Meter Data Management (MDM) software, or supplier business systems. In some embodiments, the site meters 125 can obtain samples of electricity usage in real time or based on a time interval, and convey, transmit or otherwise provide the information to the computing device 135. In some embodiments, the information collected by the site meter may be referred to as meter observations or metering observations and may include the samples of electricity usage. In some embodiments, the site meter 125 can convey the metering observations along with additional information such as a unique identifier of the site meter 125, unique identifier of the consumer, a time stamp, date stamp, temperature reading, humidity reading, ambient temperature reading, etc.

In some embodiments, the computing device 135 includes an interface 140 designed and constructed to receive information from one or more component of system 100. In some embodiments, interface receives the meter observations from the one or more metering devices 125. The meter observations can be indicative of energy delivered by a power source to the plurality of consumer sites via a distribution point. For example, the meter observations can include voltage or current information associated with energy delivered or consumed at a consumer site 130. The meter observations may be associated with a time indication (e.g., a time stamp) and information that identifies the metering device and/or consumer site. For example, one or more metering observation may include a time stamp and an identifier of the metering device or consumer site. The one or more metering observations may further include types of data such as voltage, current, energy, power, capacitance, inductance, resistance, or other characteristics of energy or a power distribution circuit. In some embodiments, the metering devices may store the information or transmit the information to a computing device for further processing. In some embodiments, the metering devices transmit the information in real-time, such as a real-time data feed or streamlining. In some embodiments, the metering devices can periodically transmit the information to the computing device for further processing.

In some embodiments, the computing device 135 includes a classifier 145 designed and constructed to classify consumer sites based on consumer classification criteria into consumption classes. For example, consumer classification criteria can include (i) residential 240V single phase with service up to 150 A, (ii) residential 240V single phase with service at least 200 A, (iii) small commercial with unit capacity up to 100 k VA, (iv) commercial with 480V three phase and unit capacity up to 500 kVA, and (v) commercial/industrial with unit capacity of at least 500 kVA. In some embodiments, consumer classifications criteria can also include demographic information (e.g., household size, population density, family size, marital status, etc.).

In some embodiments, a consumer class can be based on one or more classification criteria or a combination of criteria. In some embodiments, a consumer class may correspond to a subpopulation associated with a substantially similar probability structure as compared to a full population. For example, a subpopulation may have a substantially similar probability of using a certain amount of energy, having demographic characteristic, or other classification criteria as compared to the full population.

In some embodiments, the computing device 135 can sort the available metering observations such that each observation is allocated to one of the established consumption classes. For example, the computing device 135 can identify that a metering observation is associated with an identifier of a site meter 125 or consumer site 130, and then categorize, associate, link, or otherwise group the metering observation with a consumption class corresponding to the consumer site 130.

In some embodiments, the computing device 135 includes a sampler 150 designed and constructed to obtain metering observations. The computing device 135 can compute and record an interval per-unit apparent power for each metered site using a metered apparent demand (VA) and the base capacity of the site connection. For example, the computing device 135 can determine a demand interval required for the application of estimates (such as hourly, every 12 hours, daily, bi-weekly, or any other demand interval to facilitate estimating the allocation of energy delivered). In some embodiments, the computing device measures, determines, computes or otherwise identifies additional characteristics of electricity delivered to the consumer site such as a power factor. The computing device 135 can compute and record sample statistics of the per-unit apparent power and the associated power factors based, at least in part, on the record of the interval per-unit apparent power for each metered site of a consumption class. The system may obtain, identify, determine or otherwise receive a sample mean and variance.

In some embodiments, the computing device 135 includes and estimator designed and constructed to estimate allocation of energy of a power distribution system. For one or more identified consumption classes, the computing device 135 can determine if the site metering coverage is complete. In the event the site metering coverage is complete, the computing device 135 can determine that the segregated computed sample statistics, based on the identified consumption classes, are unbiased estimates of the corresponding sub-population parameters for the associated consumption class.

However, if the coverage is incomplete, the system can construct the sampling distribution of a metric or sample statistic (e.g., means, variance, standard deviation) for one or more affected consumption class. For example, a sampling distribution of a sample statistic or metric may refer to a model of distribution of a statistic. For example, the computing device may repeatedly analyze a sample of size N from the population distribution (e.g., consumer sites or consumer sites of a classification of consumer sites; or number samples of each consumer site or a number of samples of a number of sites of each consumer class) and compute a particular statistic or metric each time. The resulting distribution of statistics may be referred to the distribution of that statistic. In some embodiments, the number of samples may refer to samples of a particular consumer site over a course of a demand interval. In some embodiments, the number of samples may refer to a mean value over several consumer sites in a consumer class over the demand interval.

In an illustrative example, suppose that a sample of size 100 (N=100) is taken from a consumer classification class. The mean of the 100 numbers is computed. Next a new sample of 100 is taken, and the mean is again computed. If this process were repeated several number of times, the distribution of the now several number of sample means may be referred to as the sampling distribution of the mean.

The computing device can determine or identify sample size and an estimated number of samples. In some embodiments, the system can estimate (e.g., via estimator 155) the total apparent demand for each consumption class using the mean per-unit estimates and the total connected capacities derived from utility records (e.g., a maximum electric output a generator or the power source or power plant 105 can produce under specific conditions). The system can apply the estimated mean power factor for each consumption class to estimate the total real demand (e.g., the active power used to do work on the load).

In some embodiments, the computing device 135 can sum the estimated demand for each consumption class to determine a total consumer demand. For example, the computing device can sum the demands for consumption classes having complete coverage (e.g., where each consumer site has a metering device or metering information is available for each consumer site) as well as consumption classes having incomplete coverage (e.g., where one or more consumer site does not have corresponding metering information) by using the sample distribution of a statistical metric. Using the sum of demands, the computing device 135 may further determine dissipation metric by comparing the sum of the demands with a characteristic of electricity supplied by the power source or power plant 105, substation 115, or distribution point 120. The dissipation metric may refer to or indicate the amount of energy that is loss throughout the distribution system or infrastructure (e.g., due to conveying energy from power plant 105 to transmission tower 110 to substation 115 to distribution point 120 and ultimately to a consumer site 130).

In one embodiment, the computing device 135 can calculate a confidence level for the determined demands or dissipation metric or the power dissipation. For example, the dissipation metric may be determined based on a difference between the power supplied or provided at the substation from and the sum of demands of the plurality of consumer sites 130. For example, the power dissipation may be the power at the substation 115 minus the sum of real power demands of the consumer classes. The system can compare the results of the summation against the circuit quantities metered at the origin (e.g., substation) to obtain one or more dissipation metrics.

In some embodiments, the computing device 135 may perform one or more statistical techniques on the metered observations, per-unit characteristics, sampling distribution of a statistical metric, demands, or dissipation factors or metrics to determine a confidence level. For example, the computation device 135 may determine a variance or standard deviation for one or more of these values over a period of time (e.g., a demand interval, or a plurality of demand intervals) to determine whether a determine values for a certain demand interval falls within a standard deviation or confidence level (e.g., a probability that the value falls within a specific range of values or the reliability of an estimate).

For example, the computing device may employ a confidence interval to measure the reliability of an estimate of the characteristic of electricity. The confidence interval may be calculated from the observations. The frequency with which an observed interval includes the parameter can be determined by the confidence level or confidence coefficient. For example, the confidence level may refer to when confidence intervals are constructed across many separate data analyses of repeated (and possibly different) experiments, the proportion of such intervals that contain the true value of the parameter matches the confidence level. In some embodiments, the confidence level may include upper and lower confidence bounds.

In some embodiments, the level of incompleteness of a consumer class may affect the confidence level. For example, if a consumer class contains many consumers without metering devices, then the estimate may be associated with a lower confidence level.

In some embodiments, the computing device 135 can repeatedly compute and record the interval per-unit apparent power for one or more metered sites, compute and record the sample statistics of the per-unit apparent power and associated power factors, determine whether the site metering coverage is complete, construct sampling distribution means if coverage is not complete, and/or estimate the apparent demand for each consumption class. In some embodiments, computing device 135 can be configured to operate in an automated Volt\VAR optimization and/or non-Volt\VAR optimization regimes in order to compare the effects on consumer demand and infrastructure dissipation.

Figure 2:
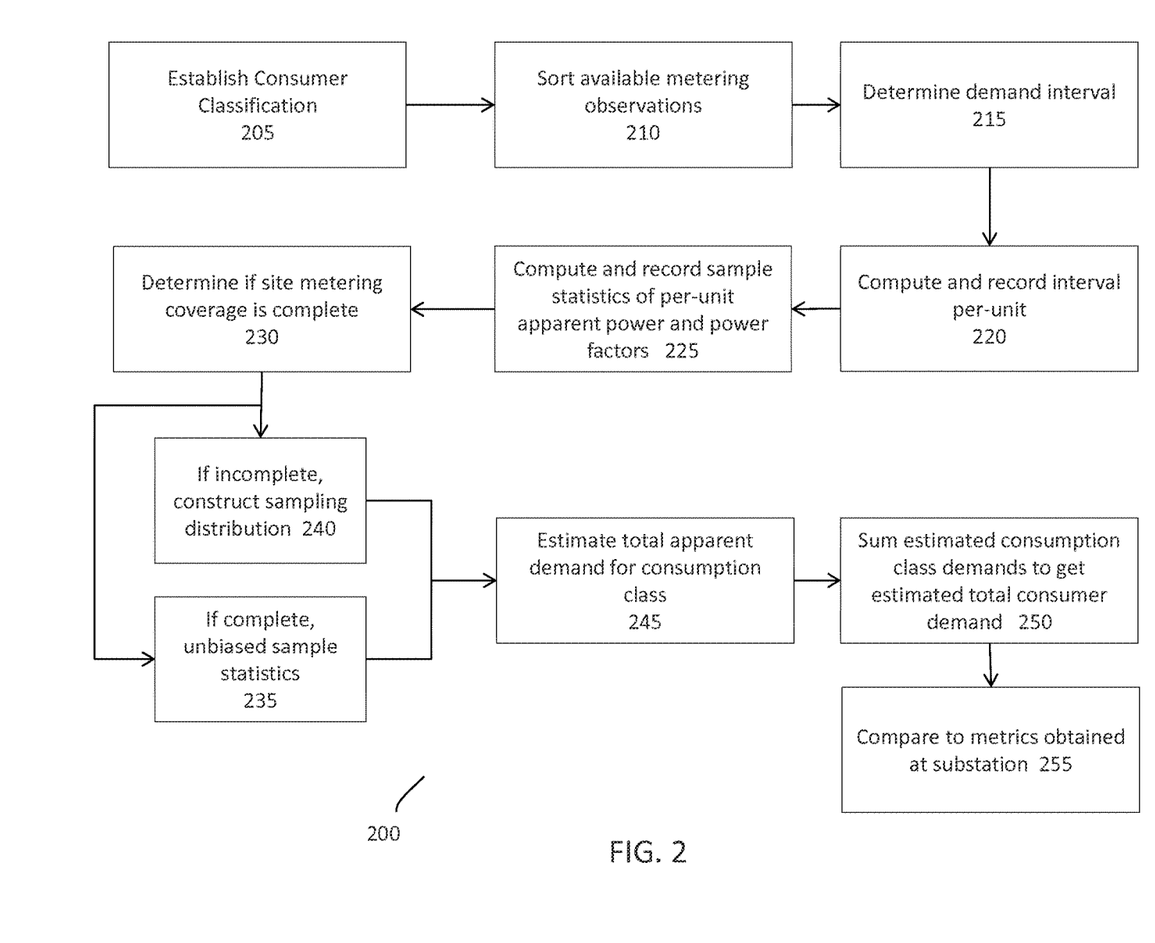
FIG. 2 is a flow chart depicting an embodiment of a method of estimating the allocation of energy delivered when there is incomplete metering information.

FIG. 2 is a flow chart depicting a method 200 of estimating the allocation of energy delivered when there is incomplete metering information. The method 200 can be performed by system 100 or computing device 135. The method 200 can include establishing consumer classification criteria such as (i) residential 240V single phase, service up to 150 A; (ii) residential 240V single phase, service at least 200 A; (iii) small commercial, unit capacity up to 100 kVA; (iv) commercial, 480V three phase, unit capacity up to 500 kVA;

(v) commercial/industrial, unit capacity at least 500 kVA (205). The method 200 can include sorting the available metering observations such that each observation is allocated to exactly one of the consumption classes established in 205 (210). For example, large consumers may be metered, so that their metering observations may be used in accumulating total consumption; estimates derived from consumption class statistics may not apply to these consumers. The method 200 can include determining a demand interval for the application of estimates (215). The method 200 can include computing and/or recording the interval per-unit apparent power for one or more metered sites using, e.g., the metered apparent demand (VA) and the base capacity of the site connection (220). The power factor associated with this observation can be recorded. The method 200 can include computing and/or recording the sample statistics of the per-unit apparent power and the associated power factors from (220) on the consumption class basis; sample mean and variance are required (225). The method 200 can include determining, for one or more consumption class, if the site metering coverage is complete (230). The method 200 can include segregating, if coverage is complete, the sample statistics computed in (220) by consumption class in (210) can be assumed to be unbiased estimates of the corresponding sub-population parameters for the associated consumption class (235). The method 200 can include constructing, if coverage is incomplete, the sampling distribution of means for one or more affected consumption class; the choice of sample size and estimated number of samples may be later determined (240). The method 200 can include estimating the total apparent demand for each consumption class using the mean per-unit estimates and the total connected capacities derived from utility records (245). The method can include applying the estimated mean power factor for each consumption class to estimate the total real demand. The method 200 can include summing the estimated consumption class demands to obtain the estimated total consumer demand (250). In one embodiment, the method can include calculating confidence based variance estimates. The method 200 can include comparing the results in (250) against the circuit quantities metered at the origin (substation) to obtain one or more dissipation metrics (255).

Figure 3:
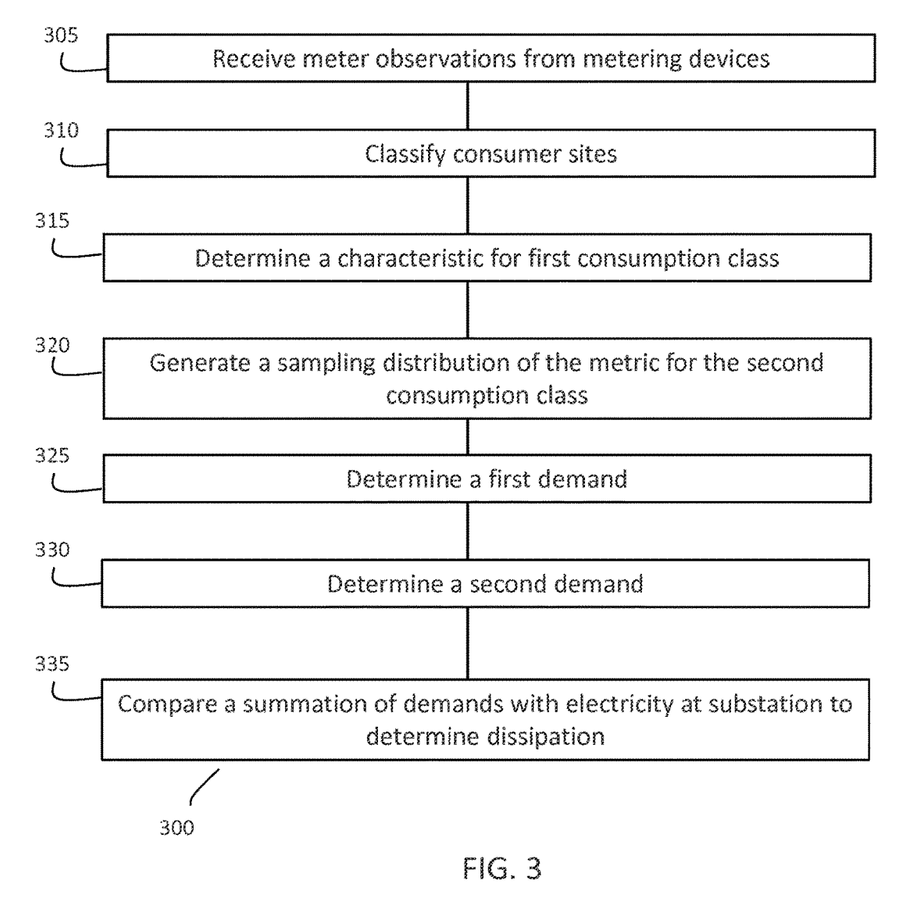
FIG. 3 is a flow chart depicting another embodiment of a method of estimating the allocation of energy delivered when there is incomplete metering information.

FIG. 2 is a flow chart depicting another method 300 of estimating the allocation of energy delivered when there is incomplete metering information. In brief overview, and in some embodiments, a computing device receives meter observations at step 305. At step 310, the metering classifies consumer sites into consumer classes. At step 315, the computing device determines a per-unit characteristic of electricity supplied to the consumer sites. At step 320, the computing device generates a sampling distribution of the metric for the second consumption class. At step 325, the computing device determines a first demand for the first consumption class. At step 330, the computing device determines a second demand for the second consumption class. At step 335, the computing device determines a dissipation metric by comparing a sum of demands of the consumption classes with a characteristic of electricity (e.g., power) supplied by a power source, at a substation or some other point in the distribution infrastructure.

In further detail, at step 305 the computing device receives meter observations of a characteristic of electricity supplied to a plurality of consumer sites via a power source. The characteristic of electricity may include, for example, voltage, current, power, power factor, energy, resistance, load, capacitance, inductance, etc. The metered observations may include samples of the characteristic of electricity. The metered observations may be in one or more units such as Volts, Amps, Ohms, farads, the henry, etc. The samples of the characteristics of electricity may be taken at a sample rate such as once per second, multiple times per second, once millisecond. Sample rate may be expressed as a frequency and may range, for example, from 0.01 Hz to 100 KHz.

The metered observations may be obtained from one or more metering devices. The metering devices may be coupled to a consumer site, such as at a point where electricity is supplied from a distribution point to a consumer site for use by one or more electronic devices or loads at a consumer site. In some embodiments, the metering device may be placed at a node in the distribution network, such as at a distribution point, substation, or other point in the distribution network. The metering device may be coupled to the consumer site or node such that the metering device can obtain measurements, readings, monitor, take samples, or otherwise obtain information about electricity supplied at the node or consumer site.

In some embodiments, not all consumer sites may have metering devices. For example, a first consumer site of the plurality consumer sites may be coupled to a first metering device of the one or more meter devices, while a second consumer may not have a metering device (e.g., the one or more metering devices may be absent from the second consumer site). In some embodiments, absence of the metering device at the consumer may further refer to the metering device at the consumer site not functioning properly or samples associated with the consumer site being lost, corrupted, or otherwise unusable by the computing device.

At step 310, the computing device classifies the consumer sites into consumption classes (or consumer classes or classes). The consumer sites can be classified based on various classification criteria including, e.g., demographic information, voltage configuration (e.g., 120 volts ("V"), 240 V, 480 V, etc.), current configuration (e.g., 15 amp, 50 amp, 60 amps, 100 amps, 200 amps, 500 amps, 1000 amps, etc.), nominal connection capacity (e.g., (i) 240V single phase, service up to 150 A; (ii) residential 240V single phase, service at least 200 A; (iii) small commercial, unit capacity up to 100 kVA; (iv) commercial, 480V three phase, unit capacity up to 500 kVA; (v) commercial/industrial, unit capacity at least 500 kVA), residential vs. commercial consumer site, etc.

The computing device may further determine that a first consumption class has complete coverage (e.g., the consumer sites of the first consumption class have metering devices) while a second consumption class does not have complete coverage (e.g., a consumer site is missing a metering device).

In some embodiments, the computing device associates each of the meter observations with a corresponding consumption class of the plurality of consumption classes. For example, each meter observation may include an identifier or information about a metering device or consumer site, and the computing device can aggregate the metered observations with a corresponding consumption class that includes the consumer site.

At step 315, and in some embodiments, the computing device can determine a metric for a characteristic of electricity for the first consumption class having complete coverage. In some embodiments, the computing device determines a first demand based on a mean (or average) characteristic of electricity for the first consumption class (e.g., average voltage and current over a demand interval).

In some embodiments, the computing device determines a per-unit characteristic of the electricity for the first consumption class. A per-unit characteristic may refer to a characteristic such as volts, current, power, real power, apparent power, power factor, etc. on a unit-basis. For example, a per-unit system may be the expression of system quantities as fractions of a defined base unit quantity. Using per-unit values may simplify calculations because quantities expressed as per-unit may not change when they are referred from one side of a transformer (e.g., in the substation or distribution point) to the other. The computing device may convert per-unit quantities to volts, ohms, or amperes using the base that the per-unit quantities were referenced to.

The per-unit system can provide units for power, voltage, current, impedance, and admittance. Quantities can be specified as multiples of selected base values. For example, the base power might be the rated power of a transformer, or perhaps an arbitrarily selected power which makes power quantities in the system more convenient.

At step 320, and in some embodiments, the computing device generates a sampling distribution of the metric for the characteristic for the second consumption class having incomplete coverage. The computing device may generate a sampling distribution for the metric for the second consumption class because the second consumption class has incomplete coverage (e.g., one or more consumer site in the second consumption classification may not include a metering device or metered observation information for these one or more consumer sites may be missing or otherwise not accessible to the computing device). In some embodiments, the computing device performs one or more of the determinations of method 300 using a per-unit system.

In some embodiments, the computing device determines the second demand based on a mean of a means sampling distribution of the characteristic for the second consumption class (e.g., the average of an average of sampling distributions of power). In some embodiments, the sample size can be predetermined. The sample size may be an absolute number (e.g., 10 to 10000 consumer sites or samples). In some embodiments, the sample size may be a relative value or a ratio (e.g., 1 to 50% of the total consumer sites or total consumer sites in a consumption class).

In some embodiments, at step 325, the computing device determines a first demand for the first consumption class based on the metric for the characteristic of electricity for the first consumption class. The computing device may determine the first demand based on a per-unit metric. The demand may, for example, refer to an energy demand during time interval (e.g., a demand interval) such as per second, per minute, hourly, daily, every 12 hours, or any other time period that facilitates allocation of energy in a distribution system. In some embodiments, the demand may be determined using characteristics of electricity supplied throughout the distribution infrastructure including, e.g., voltage, current, power factor, impedance, etc.

In some embodiments, at step 330, the computing device determines a second demand for the second consumption class based on the sampling distribution of the metric for the characteristic for the second consumption class. The second demand may be an estimate of the demand because there is incomplete coverage in the second consumption class. The demand may be a statistical computation satisfying a confidence level.

In some embodiments, there may be several consumption classes (e.g., 2 to 50 or more consumption classes). In some embodiments, one or more consumption classes may have complete coverage, while one or more other consumption classes have incomplete coverage. In some embodiments, no consumption class may have complete coverage, while in other embodiments every consumption class may have complete coverage.

In some embodiments, the computing device determines the power demands by correcting for power factor. For example, the power demand may include an apparent power value, a real power value, a reactive power value and a power factor angle. The power factor may refer to the ratio of the real power to the apparent power (e.g., real power divided by apparent power). Thus, and in some embodiments, the computing device may have access to a power factor value and determine the real power or apparent power based on the power factor (e.g., apparent power=power factor*real power). The power factor may be represented as a percentage such as 80%, 85%, 90% or any other percentage, or as a ratio (e.g., 5/10, 4/5, etc.)

At step 335, and in some embodiments, the computing device determines a dissipation metric of the distribution infrastructure or a portion thereof. The dissipation metric may refer to a power dissipation throughout the distribution infrastructure or portion thereof. The power dissipation may be determined by summing the demand from all consumer classes and subtracting this sum from an amount of power supplied at a node (e.g., at a substation, power source, distribution point, etc.) that includes all the consumer site. For example, a power supplied at a node for which the demand has been determined or estimated for all corresponding consumer sites or consumption classes of the node.

While this specification contains many specific embodiment details, these should not be construed as limitations on the scope of any inventions or of what may be claimed, but rather as descriptions of features specific to particular embodiments of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

The phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Thus, particular embodiments of the subject matter have been described. Other embodiments are within the scope of this disclosure. In some cases, the actions recited in this disclosure can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

What is claimed is:

1. A method of allocating energy provided by a power source, comprising:
    receiving, by a computing device from one or more metering devices, meter observations of a characteristic of electricity supplied to a plurality of consumer sites via a power source, a first consumer site of the plurality consumer sites coupled to a first metering device of the one or more metering devices, and the one or more metering devices absent from a second consumer site of the plurality of consumer sites;
    classifying, by the computing device, the plurality of consumer sites into a plurality of consumption classes, a first consumption class of the plurality of consumption classes having complete coverage and a second consumption class of the plurality of consumption classes having partial coverage, the second consumption class including the second consumer site and at least one of the plurality of consumer sites coupled to at least one of the one or more metering devices;
    determining, by the computing device, a first value for a metric for the characteristic of electricity for the first consumption class having complete coverage within the first consumption class;
    generating, by the computing device, a sampling distribution of one or more second values of the metric for the characteristic of electricity for the second consumption class having partial coverage within the second consumption class;
    determining, by the computing device, a first demand for the first consumption class based on the first value for the metric for the characteristic of electricity for the first consumption class;
    determining, by the computing device, a second demand for the second consumption class having partial coverage based on the sampling distribution of the one or more second values of the metric for the characteristic of electricity for the second consumption class; and
    comparing, by the computing device, a summation of the first demand for the first consumption class having complete coverage within the first consumption class and the second demand determined based on the sampling distribution for the second consumption class having partial coverage with a characteristic of electricity observed at a substation to determine a dissipation metric, the substation conveying electricity from the power source to the plurality of consumer sites.

2. The method of claim 1, further comprising:
classifying the consumer sites into the plurality of consumption classes based on at least one of a demographic consideration and a connection capacity.

3. The method of claim 1, further comprising:
associating, by the computing device, each of the meter observations with a corresponding consumption class of the plurality of consumption classes.

4. The method of claim 1, wherein the metric comprises a statistical metric including at least one of a mean, a standard deviation, and a variance.

5. The method of claim 1, further comprising:
identifying, by the computing device, for each of the plurality of consumption classes, a per-unit characteristic of electricity based on the meter observations from the one or more metering devices.

6. The method of claim 1, further comprising:
determining, by the computing device, the first demand based on a mean characteristic for the first consumption class; and
determining, by the computing device, the second demand based on a mean of a means sampling distribution of the one or more second values of the metric for the characteristic of electricity for the second consumption class.

7. The method of claim 1, further comprising:
determining, by the computing device, the sampling distribution of the one or more second values of the metric for the characteristic of electricity for the second consumption class based on a predetermined sample size.

8. The method of claim 1, further comprising:
determining, by the computing device, the characteristic of electricity based on a per-unit apparent power for the one or more metering devices.

9. The method of claim 1, further comprising:
determining, by the computing device, the first demand based on a first power factor for the first consumption class; and
determining, by the computing device, the second demand based on a second power factor for the second consumption class.

10. The method of claim 1, further comprising:
identifying, by the computing device, a demand interval for determining the first demand and the second demand; and
repeating, by the computing device, the determining of the first demand and the second demand based on the demand interval.

11. The method of claim 1, further comprising:
determining, by the computing device, the second demand based on a confidence threshold.

12. The method of claim 1, further comprising:
receiving, by the computing device, the characteristic of electricity observed at the substation via a metering device at the substation.

13. A system for allocation of energy provided by a power source, comprising:
    one or more metering devices coupled to one or more consumer sites of a plurality of consumer sites, a first consumer site of the plurality consumer sites coupled to a first metering device of the one or more metering devices, and the one or more metering devices absent from a second consumer site of the plurality of consumer sites;

an interface of a computing device configured to receive, from the one or more metering devices, meter observations of a characteristic of electricity supplied to a plurality of consumer sites via a power source;

a classifier of the computing device configured to classify the plurality of consumer sites into a plurality of consumption classes, a first consumption class of the plurality of consumption classes having complete coverage and a second consumption class of the plurality of consumption classes having partial coverage, the second consumption class including the second consumer site and at least one of the plurality of consumer sites coupled to at least one of the one or more metering devices;

an estimator of the computing device configured to:
determine a first value for a metric for the characteristic of electricity for the first consumption class having complete coverage within the first consumption class;
generate a sampling distribution of one or more second values of the metric for the characteristic of electricity for the second consumption class having partial coverage within the second consumption class;
determine a first demand for the first consumption class based on the first value for the metric for the characteristic of electricity for the first consumption class;
determine a second demand for the second consumption class having partial coverage based on the sampling distribution of the one or more second values of the metric for the characteristic of electricity for the second consumption class; and
compare a summation of the first demand for the first consumption class having complete coverage within the first consumption class and the second demand determined based on the sampling distribution for the second consumption class having partial coverage with a characteristic of electricity observed at a substation to determine a dissipation metric, the substation conveying electricity from the power source to the plurality of consumer sites.

14. The system of claim 13, wherein the computing device is further configured to:
classify the consumer sites into the plurality of consumption classes based on at least one of a demographic consideration, a nominal connection capacity, and a probability structure.

15. The system of claim 13, wherein the computing device is further configured to:
associate each of the meter observations with a corresponding consumption class of the plurality of consumption classes.

16. The system of claim 1, wherein the metric comprises a statistical metric including at least one of a mean, a standard deviation, and a variance.

17. The system of claim 13, wherein the computing device is further configured to:
identify, for each of the plurality of consumption classes, a per-unit characteristic of electricity based on the meter observations from the one or more metering devices.

18. The system of claim 13, wherein the computing device is further configured to:
determine the first demand based on a mean of a per-unit characteristic for the first consumption class, the per-unit characteristic for the first consumption class based on a first defined base unit quantity; and
determine the second demand based on a mean of a means sampling distribution of a per-unit characteristic for the second consumption class, the per-unit characteristic for the second consumption class based on a second defined base unit quantity.

19. The system of claim 13, wherein the computing device is further configured to:
determine the sampling distribution of the one or more second values of the metric for a per-unit characteristic for the second consumption class based on a predetermined sample size, the per-unit characteristic for the second consumption class based on a defined base unit quantity.

20. The system of claim 13, wherein the computing device is further configured to:
determine the characteristic of electricity based on a per-unit apparent power for the one or more metering devices.

* * * * *